United States Patent
Dange et al.

(10) Patent No.: US 11,582,032 B2
(45) Date of Patent: Feb. 14, 2023

(54) SYSTEM AND METHOD FOR SHARING USER PREFERENCES WITHOUT HAVING THE USER REVEAL THEIR IDENTITY

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( * ) Notice: Subject to any disclaimer, the term of this patent is extended or adjusted under 35 U.S.C. 154(b) by 223 days.

(21) Appl. No.: 17/018,273

(22) Filed: Sep. 11, 2020

(65) Prior Publication Data
US 2021/0091937 A1    Mar. 25, 2021

Related U.S. Application Data

(60) Provisional application No. 63/029,717, filed on May 26, 2020, provisional application No. 62/954,591, (Continued)

(51) Int. Cl.
*H04L 9/08* (2006.01)
*H04L 9/30* (2006.01)
*G06F 7/58* (2006.01)

(52) U.S. Cl.
CPC ............ *H04L 9/0861* (2013.01); *G06F 7/588* (2013.01); *H04L 9/0866* (2013.01); *H04L 9/30* (2013.01)

(58) Field of Classification Search
CPC ....... H04L 9/0861; H04L 9/0866; H04L 9/30; G06F 7/588
See application file for complete search history.

(56) References Cited

U.S. PATENT DOCUMENTS 7,013,290 B2 *  3/2006  Ananian ............ G06Q 30/0615
                                                  705/26.42
7,340,438 B2    3/2008  Nordman et al.
(Continued)

FOREIGN PATENT DOCUMENTS

JP        4675660 B2      4/2011
JP      2014127164 A      7/2014

OTHER PUBLICATIONS

Bon K. Sy; Arun P. Kumara Krishnan. "Generation of Cryptographic Keys from Personal Biometrics: An Illustration Based on Fingerprints.", Intech, 2012, pp. 191-218.
(Continued)

*Primary Examiner* — Cheng-Feng Huang
(74) *Attorney, Agent, or Firm* — Shumaker, Loop & Kendrick, LLP (57) ABSTRACT

A system and method for sharing user preferences pertaining to one or more products, without having the user reveal their identity, is described herein. The system is configured for registering a user by receiving a set of biometric samples of the user, processing the set of biometric samples to compute a Secret-Key (S1) corresponding to the user, generating a Unique-Number (N1) using a random number generation algorithm, applying a Function (F1) to the Secret-Key (S1) and the Unique-Number (N1), to compute a Public-Key (P1). Once the user is registered, the system is configured to receive a biometric sample from the user in real-time and compute the Secret-Key (S2) for authenticating the user. Once the user is authenticated, the system may recommend to the user, a candidate product from a product catalog, based on the user's preferences.

11 Claims, 6 Drawing Sheets

Related U.S. Application Data filed on Dec. 29, 2019, provisional application No. 62/906,080, filed on Sep. 25, 2019.

(56) References Cited

U.S. PATENT DOCUMENTS

| | | | |
|---|---|---|---|
| 7,496,191 B1 | 2/2009 | Crews et al. | |
| 7,769,633 B2 | 8/2010 | Jokinen et al. | |
| 8,170,615 B2 | 5/2012 | Vanska et al. | |
| 9,633,269 B2 | 4/2017 | Gu et al. | |
| 10,136,191 B1* | 11/2018 | Lewis | G06F 16/9038 |
| 10,489,826 B2 | 11/2019 | Matthews et al. | |
| 10,530,577 B1* | 1/2020 | Pazhoor | H04L 9/3247 |
| 11,252,479 B2* | 2/2022 | Lewis | G06F 16/9038 |
| 2003/0028451 A1* | 2/2003 | Ananian | H04L 63/102 |
| | | | 705/26.42 |
| 2008/0072068 A1* | 3/2008 | Wang | H04L 9/3242 |
| | | | 713/191 |
| 2009/0271634 A1* | 10/2009 | Boult | H04L 9/0877 |
| | | | 713/186 |
| 2015/0006895 A1* | 1/2015 | Irvine | G06F 21/6218 |
| | | | 713/171 |
| 2017/0141920 A1* | 5/2017 | Herder, III | H04L 9/3263 |
| 2018/0307859 A1* | 10/2018 | LaFever | H04L 63/20 |
| 2020/0204545 A1 | 6/2020 | Pacella et al. | |
| 2020/0266989 A1* | 8/2020 | Krcmaricic-Barackov | |
| | | | H04L 9/3213 |

OTHER PUBLICATIONS

Reinhard Hochrieser "Online Dating Can Benefit From Identity Verification And Biometric Authentication In 2019", www.informationsecuritybuzz.com, Jul. 18, 2019, All Pages.

"Face Liveness Detection For Safe Biometric Authentication And Face Recognition", Banuba, 2020, pp. 1-9.

Matt Kapko; Matthew Finnegan "What is Windows Hello? Microsoft's biometrics security system explained", Microsoft Docs, 2020, pp. 1-4.

Bendik B. Mjaaland et al.; Norwegian University of Science and Technology "Biocryptics: Towards Robust Biometric Public/Private Key Generation", NISK, 2009, pp. 27-42.

Sayani Chandra et al., "Generate an Encryption Key by using Biometric Cryptosystems to secure transferring of Data over a Network", IOSR Journal of Computer Engineering, 2013, pp. 16-22.

* cited by examiner

SYSTEM AND METHOD FOR SHARING USER PREFERENCES WITHOUT HAVING THE USER REVEAL THEIR IDENTITY

CROSS-REFERENCE TO RELATED APPLICATIONS AND PRIORITY

The present application claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also claims priority from U.S. Provisional Application No. 63/029,717 filed on May 26, 2020 entitled "Method and system of storing identity and signature using the human body as a node."

TECHNICAL FIELD

The present subject matter described herein, in general, relates to a system and a method for sharing user preferences. More specifically, the present subject matter discloses the system and method for sharing user preferences with business entities, pertaining to one or more products, without having the user reveal their identity.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, software applications require people to provide their identity as well as personal information in order to receive personalized services. However, this practice has resulted in several undesirable outcomes. People end up creating a different profile for each application such as Gmail™, Twitter™, Amazon™ etc. As the number of profiles increases, it becomes difficult to manage these profiles. On an average an online user has 7.6 social media accounts. Many of these online profiles are created using fake identities. An estimated 30% of profiles on social media are based on fake identities.

Moreover, in the existing social networking platforms, there is no barrier to keep a user from creating a profile that corresponds to someone other than themselves. Furthermore, users don't always have control over their online profile's visibility to others within or outside of their own human network. User privacy is also at risk as different applications have different privacy standards.

Additionally, software applications often collect more personal information from users than is needed to provide the application's functionality. This information may be misused by these software applications for targeted advertising. Generally, the information captured by these software applications is used to run advertising campaigns targeted at social media audience cohorts whose attributes are extrapolated from their online activity. This may include the web searches they perform, the content they consume, and the social media posts they engage with. This method poses several limitations. The search and social media platforms that track users' activity often have access to users' identity. Although social media platforms mask their users' identity from advertisers and developers, there is a massive burden on the social media platforms to protect their users' identity and keep it hidden from advertisers and developers at all times. More importantly, users' identity is not hidden from the platforms themselves, thereby creating an exception for the platforms in respect of the rule applied to the advertisers that no single entity should have access to people's identity as well as activity.

Furthermore, ecommerce businesses such as Amazon™ and eBay™ capture users' activity data on one product platform and apply it to other products using shared cookies.

Users often have no visibility into which businesses have access to what part of their personal information. The collection of users' attributes and preferences is a one-way flow. Platforms gather users' activity data and retain it permanently. Users have no control over their own activity data once it has been captured by the platform. Moreover, users do not use platforms with the intention of providing the platforms with their personal information. Therefore, finding themselves to be the target of advertisements based on specific personal attributes detected by platforms makes them feel violated. Platforms algorithmically interpret people's engagement data to deduce their attributes and preferences. Hence, there is a level of abstraction between users' actual attributes and preferences, and those targeted by businesses in their advertising campaigns on platforms.

Also, there is an inherent limit to how deeply businesses can understand a user's real attributes and preferences. Users do not know how much of their personal information and preferences that they did not share with anyone intentionally is stored and shared by platforms. This causes widespread anxiety and stress among people. Conversely, in the absence of users' activity on social media platforms, there is insufficient data to extrapolate their attributes and preferences. People's attributes and preferences also change over time. Their activity on various platforms may not reflect all the changes.

Businesses may continue to target users in their advertisements even if they no longer have the attributes they are being targeted for.

Furthermore, users' identities on the internet are stored on a network server. The server requires resources to host users' identities, keep them secure, and perform regular maintenance. Users do not always have control over their digital identity stored on the server. Every identity on the server does not necessarily correspond to a unique person. In the existing art there is no known way to prevent the storage of identities. People need to manage credentials to access their own identities on the servers.

To address some of the above issues and to manage credentials of a multitude of applications, Single Sign-On mechanisms such as OAUTH and SAML are used. The Single Sign-on mechanism allows applications to use tokens and transfer the burden of authentication to federated identity providers such as Google™ and Apple™. During the handoff from a third-party authentication to the client application, typically, personally identifiable information such as name, email, profile photo, etc., is also shared with the client application in an opt-out manner. This reintroduces vulnerabilities in the client application and negates the separation of identity authentication in the first place. Even if no personally identifiable information is handed off to the client application, the third-party authentication system is still susceptible to the same security challenges and all weaknesses are passed on downstream.

Another technique adopted for security is two-factor authentication. There are several ways by which two-factor authentication can be enabled in order to provide an additional layer of security. One method is by sending a code over email or text message.

This assumes that the client application has access to the user's email or phone number which, if true, also means that they have the ability to determine the user's identity with relative ease. Additionally, if the user's phone or email are compromised, this system works in favor of the perpetrator and further injures the victim. Another method of two-factor authentication is enabled by generating a code via a separate authentication application, it assumes that the user has control over that authentication application. If the user loses access to the authenticator application, they lose access to their identity manager. Yet another method of two-factor authentication is enabled by having the user remember a pass-phrase, a visual shape, or answers that they made up for a number of personal questions, or any variant thereof. This usually results in an unreasonable barrier for the user and a bad user experience.

Thus, there is a long-felt need for managing users' profile and preferences without revealing their identity.

SUMMARY

This summary is provided to introduce concepts related to a system and a method for sharing user preferences without having the user reveal their identity, and the concepts are further described below in the detailed description. This summary is not intended to identify essential features of the claimed subject matter nor is it intended for use in determining or limiting the scope of the claimed subject matter.

In one implementation, a system for sharing user preferences, pertaining to one or more products, without having the user reveal their identity, is illustrated in accordance with an embodiment of the invention. The system comprises a processor and a memory coupled to the process. The processor is configured to execute program instructions stored in the memory for registering a user. For the purpose of registering the user, the processor may execute program instructions stored in the memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), capture a set of attributes and preferences of the user pertaining to a category of products associated with one or more business categories, store the Unique-Number (N1) on a user device and in a data repository, store the set of attributes and preferences in the data repository, and store the Public-Key (P1) on the user device and in a peer-to-peer distributed hash-table. Once the user is registered, each time the user makes a request to access the system, the processor may execute program instructions stored in the memory to authenticate the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated.

Once the user is authenticated, the processor may execute program instructions stored in the memory to recommend to the user, a candidate product from a product catalog associated with a business entity, based on the set of attributes and preferences associated with the user.

In another implementation, a method for sharing user preferences, pertaining to one or more products, without having the user reveal their identity, is illustrated in accordance with an embodiment of the invention. The method may comprise one or more steps for registering a user. For the purpose of registering the user, a processor may execute program instructions stored in a memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), capture a set of attributes and preferences of the user pertaining to a category of products associated with one or more business categories, store the Unique-Number (N1) on a user device and in a data repository, store the set of attributes and preferences in the data repository, and store the Public-Key (P1) on the user device and in a peer-to-peer distributed hash-table. Once the user is registered, the method may comprise one or more steps for authenticating the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device the user is authenticated.

Once the user is authenticated, the method may further comprise one or more steps to recommend to the user, a candidate product from a product catalog associated with a business entity, based on the set of attributes and preferences associated with the user.

In another implementation, a computer program product having a processor and a non-transitory, machine-readable storage medium for sharing user preferences, pertaining to one or more products, without having the user reveal their identity is illustrated in accordance with an embodiment of the present invention. The computer program product comprises a program code for registering a user. For the purpose of registering the user, a processor may execute the program code to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), capture a set of attributes and preferences of the user pertaining to a category of products associated with one or more business categories, store the Unique-Number (N1) on a user device and in a data repository, store the set of attributes and preferences in the data repository, and store the Public-Key (P1) on the user device and in a peer-to-peer distributed hash-table. Once the user is registered, each time the user makes a request to access the system, the computer program product may comprise a program code for authenticating the user. For the purpose of authentication, the processor may execute the program code to receive a biometric sample captured from the user in real-time, process the biometric sample to generate a Secret-Key (S2), fetch the Public-Key (P1) corresponding to the user from the user device 103, and compute a Real-Time-Unique-Number (N2) using the Public-Key (P1), the Secret-Key (S2) and the Function (F1).

Based on the comparison of the Real-Time-Unique-Number (N2) with the Unique-Number (N1) stored on the user device, the user is authenticated. The computer program product comprises a program code to recommend to the user a candidate product from a product catalog associated with a business entity, based on the set of attributes and preferences associated with the user.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
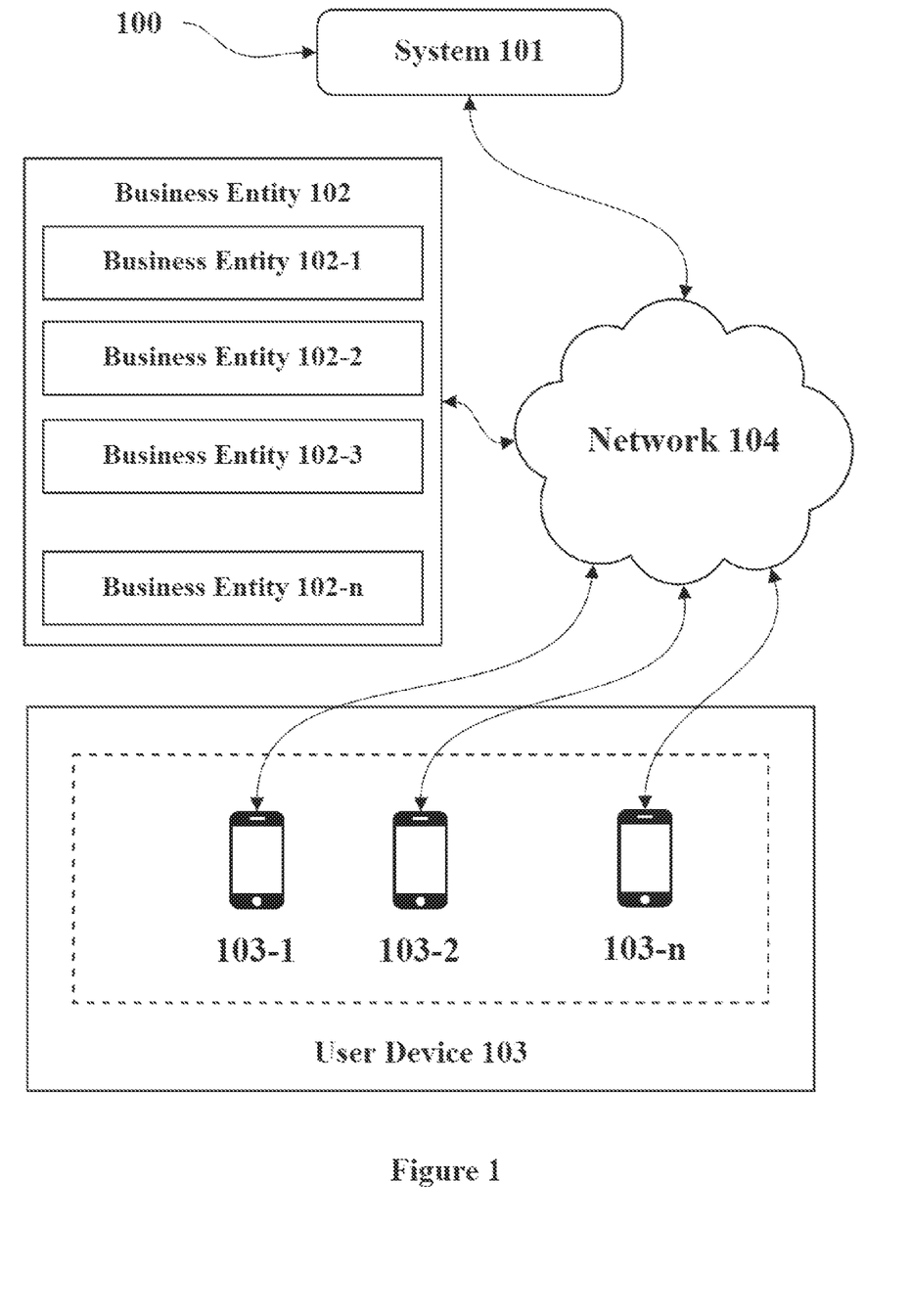
FIG. 1 illustrates a network implementation 100 of a system 101 for sharing user preferences, in accordance with an embodiment of the present disclosure.

Referring to FIG. 1, implementation 100 of system 101 for sharing user preferences is illustrated, in accordance with an embodiment of the present subject matter. In one embodiment, the system 101 may comprise a processor and a memory. Further, the system 101 may be connected to user devices and business entities through a network 104. It may be understood that the system 101 may be communicatively coupled with multiple users through one or more user devices 103-1, 103-2, 103-3 . . . , 103-n and business entities 102-1, 102-2, 102-3 . . . , 102-n collectively referred to as a user device 103 and business entity 102.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the business entity 102 may be any networking platform, media platform, messaging platform, ecommerce platform, or any other application platform. The system 101 may be configured to register users as well as business entities over the system 101. Further, the system may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Furthermore, the user devices 103 are also enabled to maintain a distributed global people's registry. The Distributed Global People Registry may be an autonomous free public utility that stores the public-key of every registered person.

In one embodiment, the business entity 102 may be a networking platform, an ecommerce platform, or any other internet-based software application which requires user authentication before providing the user with access to the application. The user and business registration process is further illustrated with the block diagram in FIG. 2.

Figure 2:
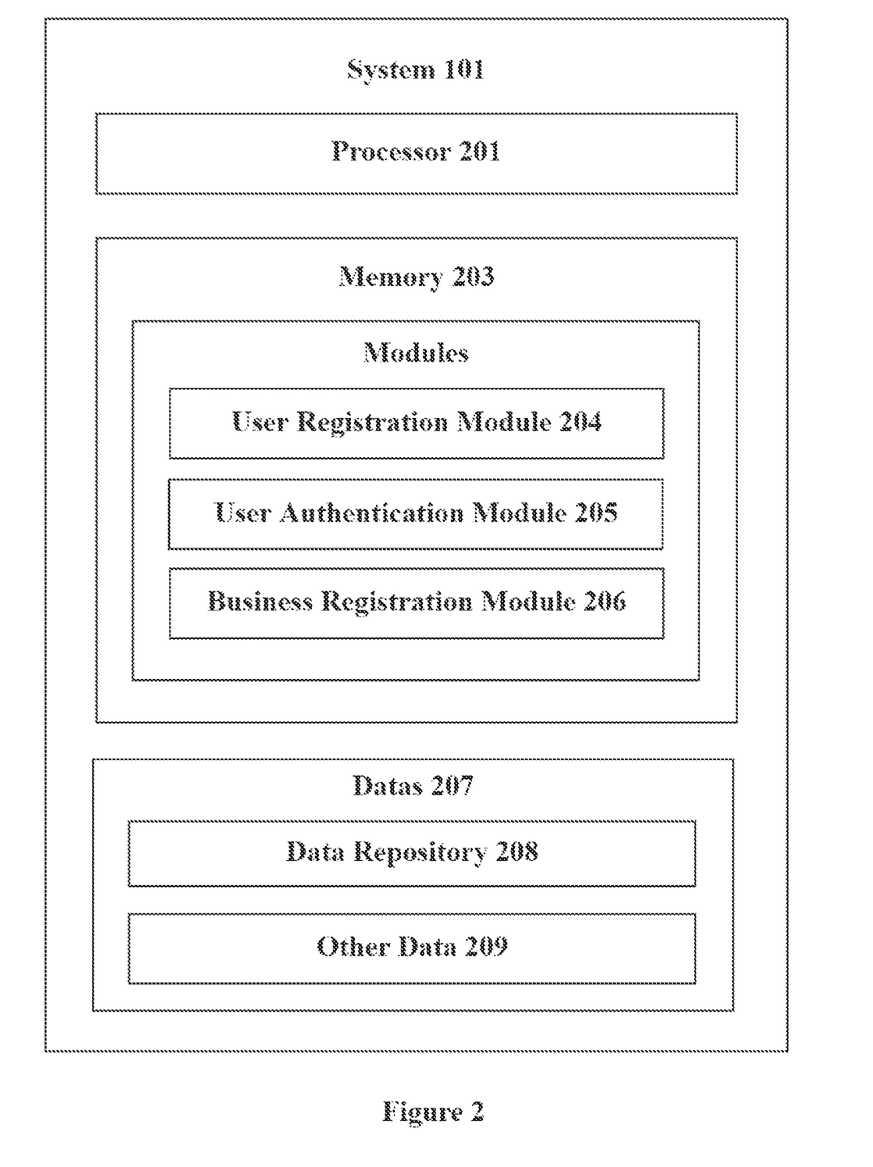
FIG. 2 illustrates components of the system 101 for sharing user preferences, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory consists of a set of modules. The set of modules may include a user registration module 204, a user authentication module 205, and a business registration module 206. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions 205 may include routines, programs, objects, components, data structures, etc., which perform particular tasks, functions, or implement particular abstract data types. The data 207 may comprise a data repository 208, and other data 209. The other data 209 amongst other things, serves as a repository for storing data processed, received, and generated by one or more components and programmed instructions. The working of the system 101 will now be described in detail referring to FIGS. 1 and 2.

In one embodiment, the processor 201 may be configured for executing programmed instructions corresponding to user registration module 204 for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein. It must be understood that the one or more biometric factors are not limited only to fingerprint, face, voice, retina, and palm vein. Any other biometric factors which can uniquely identify a user may be collected from the user.

The set of biometric samples may be captured by the user device 103 and sent to the system 101 for registration. Further, the processor 201 is configured to process the set of biometric samples to compute a Secret-Key (S1) corresponding to the user. For the purpose of computing the Secret-Key (S1) a set of unique characteristics of the biometric samples may be determined. These unique characteristics must be reproducible every time the user scans their biometrics. Further, the processor 201 is configured to generate a Unique-Number (N1). The Unique-Number (N1) can be computed using any random number generation algorithm known in the art. The Unique-Number (N1) is a random number generated only once by the random number generation algorithm. Further, the processor 201 is configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1). In alternative embodiments, the Function (F1) may be based on any other encryption technique that is known in the art.

In one embodiment, once the Secret-Key (S1), Unique-Number (N1), and Public-Key (P1) are captured, in the next step, the processor 201 is configured for capturing a set of attributes and preferences of the user pertaining to a category of products associated with one or more business categories. The attributes associated with the user may comprise shoe size, shirt size, pant size, and the like. The preferences associated with the user may comprise food preferences, clothing preferences, game, music, movie, and the like. It must be understood that the attributes and preferences may change from person to person. The system 101 may enable a user interface in order to capture the set of attributes and preferences of the user. Further, the processor 201 is configured to store the set of attributes and preferences, and the Unique-Number (N1) on a peer-to-peer distributed hash-table. Further, the processor 201 is configured to store the Public-Key (P1) of the user on the peer-to-peer distributed hash-table and on the user device 103.

The Distributed Global People Registry may be hosted on the peer-to-peer distributed hash-table. The user devices 103 may be enrolled as peers on the peer-to-peer distributed hash-table that hosts the Distributed Global People Registry. It must be noted herein that Distributed Global People Registry may be a distributed registry implemented using the technique disclosed in the public-domain publication entitled "Distributed Global People Registry" [https://www.tdcommons.org/dpubs_series/2286/]. In a similar manner, multiple users may be registered over the system 101. Every time the user makes a request to access the system 101, the Unique-Number (N1) and the Public-Key (P1) is used for authentication. It must be noted that the Secret-Key (S1) is not stored on the user device 103 or the system 101. Rather, at the time of authentication, a Secret-Key is computed in real-time. The process for user authentication is stated below.

In one embodiment, the processor 201 may be configured for executing programmed instructions corresponding to user authentication module 205 for authenticating the user. Initially the processor 201 may execute programmed instructions stored in the memory for receiving a biometric sample from the user. The biometric sample may be captured from the user in real-time. Further, the processor 201 may execute programmed instructions stored in the memory for processing the biometric sample to generate a Secret-Key (S2). It must be noted that the Secret-Key (S2) will be different from Secret-Key (S1) if the user is not the same person. Further, the processor 201 may execute programmed instructions stored in the memory for fetching the Public-Key (P1) corresponding to the user from the user device 103. Further, the processor 201 may execute programmed instructions stored in the memory for computing a Real-Time-Unique-Number (N2) using the Public-Key (P1), the Secret-Key (S2) and the Function (F1). Furthermore, the processor 201 may execute programmed instructions stored in the memory for authenticating the user based on comparison of the Real-Time-Unique-Number (N2) with the Unique-Number (N1) stored on the user device 103. It must be noted that when biometric samples from the same user are captured, the Secret-Key (S2) which is generated in real-time is the same as the Secret-Key (S1) which was used during user registration. As a result, the Real-Time-Unique-Number (N2) generated using the Public-Key (P1), the Secret-Key (S2) and the Function (F1) will be the same as the Unique-Number (N1) stored in the peer-to-peer distributed hash-table. In case false biometrics are provided during authentication, the Secret-Key (S2) generated in real-time will not be the same as the Secret-Key (S1). Due to this, the Real-Time-Unique-Number (N2) will not be equal to the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information. If the user is successfully authenticated, the processor 201 may execute programmed instructions stored in the memory for recommending to the user, a candidate product from a product catalog associated with a business entity, based on the set of attributes and preferences associated with the user. The process for registration of business entities is illustrated as below.

In one embodiment, the processor 201 may be configured for executing programmed instructions corresponding to the business registration module (206). For this purpose, the processor 201 may execute programmed instructions stored in the memory for receiving an account creation request from the business entity through the network 104. Further, the processor 201 may execute programmed instructions stored in the memory for assigning a visibility permission category to the business entity based on the business entity's service category. The visibility permission category is selected from anonymous, pseudonymous, or public-key visible. Furthermore, the processor 201 may execute programmed instructions stored in the memory for receiving the product catalog from the business entity.

In one embodiment, once the business registration is complete, the processor 201 may execute programmed instructions stored in the memory for enabling the business entity to add a product promotion campaign corresponding to one or more products from the product catalog. For this purpose, the processor 201 may execute programmed instructions stored in the memory for providing an interface for the business entity to select attributes and preferences corresponding to the attributes and preferences of the target audience for one or more of the business entity's products. Furthermore, the processor 201 may execute programmed instructions stored in the memory for providing an interface for the business entity to configure settings to promote one or more products, wherein the settings correspond to budget, period of time, audience size, and other parameters associated with the product promotion campaign.

In one embodiment, the processor 201 may execute programmed instructions stored in the memory for displaying on an interface visited by the user, the candidate product from a product catalog, such that the candidate product is discoverable by the user. It must be noted that the candidate product is selected based on the matching of the set of attributes and preferences of the user with the corresponding set of attributes and preferences of the product's target audience. Further, the processor 201 may execute programmed instructions stored in the memory for providing on the interface visited by the user, a link using which the user can access and purchase the candidate product. It must be noted that during the entire process of identifying and displaying the candidate product from a product catalog, and displaying it on an interface visited by the user, the user does not reveal any personally identifiable information to the system or to the business entity. If the preferences match, the candidate product is displayed on an interface visited by the user. The method for sharing user preferences without having the user reveal their identity is further elaborated with the flowchart of FIG. 3.

Figure 3:
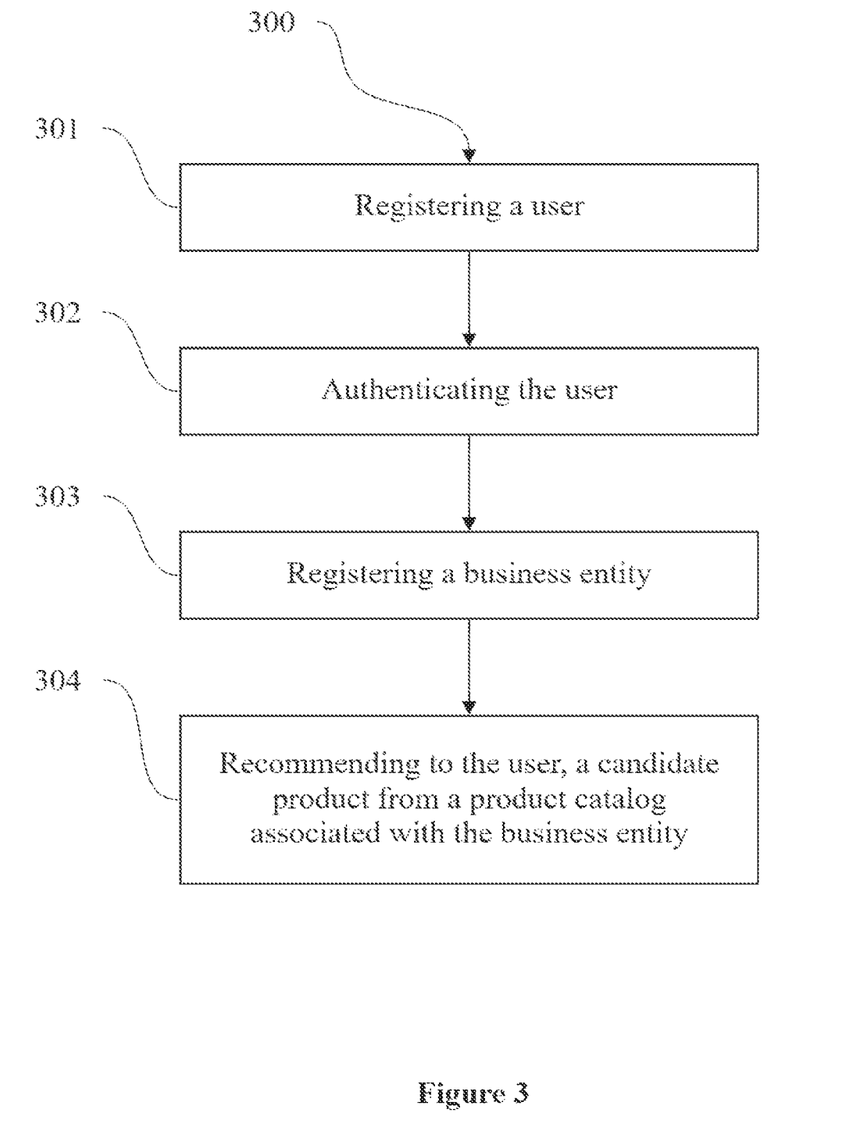
FIG. 3 illustrates a method 300 for sharing user preferences, pertaining to one or more products, without having the user reveal their identity, in accordance with an embodiment of the present disclosure.

Now referring to FIG. 3, a method 300 for sharing user preferences, pertaining to one or more products, without having the user reveal their identity is illustrated, in accordance with an embodiment of the present subject matter.

At step 301, the processor 201 may be configured for registering a user over the system 101. The detailed steps for registering a user over the system 101 are further elaborated with reference to FIG. 4.

At step 302, the processor 201 may be configured for authenticating a user over the system 101. The detailed steps for authenticating a user over the system 101 are further elaborated with reference to FIG. 5.

At step 303, the processor 201 may be configured for registering a business entity over the system 101. The steps for registering a business entity over the system 101 are further illustrated in FIG. 6.

At step 304, the processor 201 may be configured to recommend to the user, a candidate product from a product catalog associated with a business entity. The steps for recommending to the user, a candidate product using the system 101 are further illustrated in FIG. 6.

Figure 4:
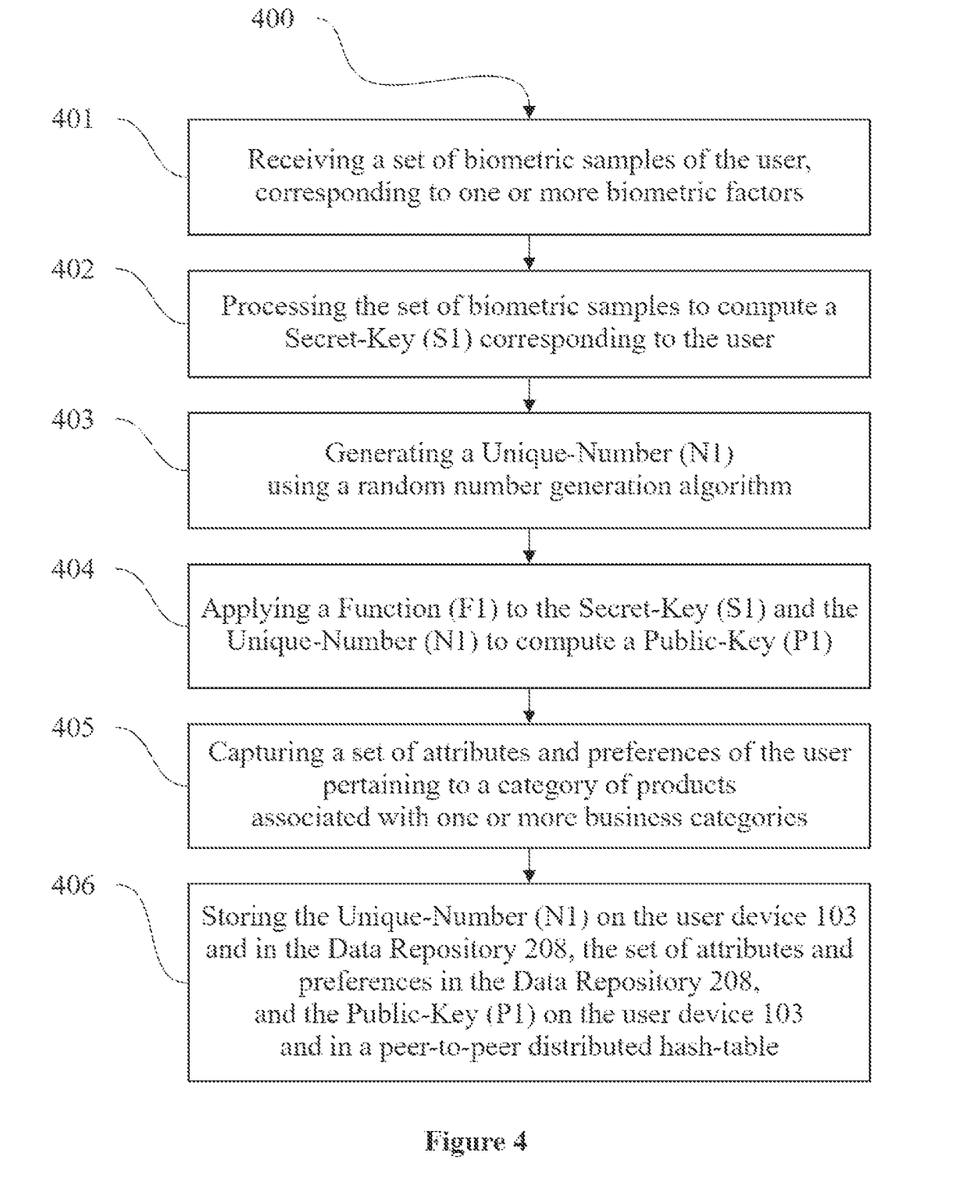
FIG. 4 illustrates a method 400 for user registration, in accordance with an embodiment of the present disclosure.

Now referring to FIG. 4, a method 400 for user registration is illustrated, in accordance with an embodiment of the present subject matter.

At step 401, the processor 201 may be configured for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein.

At step 402, the processor 201 may be configured to process the set of biometric samples to compute a Secret-Key (S1) corresponding to the user. For the purpose of computing the secret key (S1) a set of unique characteristics of the biometric samples may be determined. These unique characteristics must be reproducible every time the user scans their biometrics.

At step 403, the processor 201 may be configured to generate a Unique-Number (N1). The Unique-Number (N1) can be computed using any random number generation algorithm. The Unique-Number (N1) is a random number generated only once by the random number generation algorithm.

At step 404, the processor 201 may be configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1).

At step 405, the processor 201 may be configured to capture a set of attributes and preferences of the user pertaining to a category of products associated with one or more business categories. The attributes associated with the user may comprise shoe size, shirt size, pant size, and the like. The preferences associated with the user may comprise food preferences, clothing preferences, game, music, movie, and the like. It must be understood that the attributes and preferences may change from person to person. The system 101 may enable a user interface in order to capture the set of attributes and preferences of the user.

At step 406, the processor 201 may be configured to store the Unique-Number (N1) on the user device 103 and in a Data Repository 208. The set of attributes and preferences are stored in the Data Repository 208. The Public-Key (P1) is stored on the user device 103 and in the Distributed Global People Registry. The Distributed Global People Registry is hosted on a peer-to-peer distributed hash-table. The user devices 103 may be enrolled as peers on the peer-to-peer distributed hash-table that hosts the Distributed Global People Registry. Further, multiple users may be registered over the system 101. Every time the user makes a request to access the system 101, the Unique-Number (N1) and the Public-Key (P1) are used for authentication. It must be noted that the Secret-Key (S1) is not stored on the user device 103 or the system 101. Rather, at the time of authentication, the Secret-Key (S2) is computed in real-time. The process for user authentication is stated below with reference to the flow chart of FIG. 5.

Figure 5:
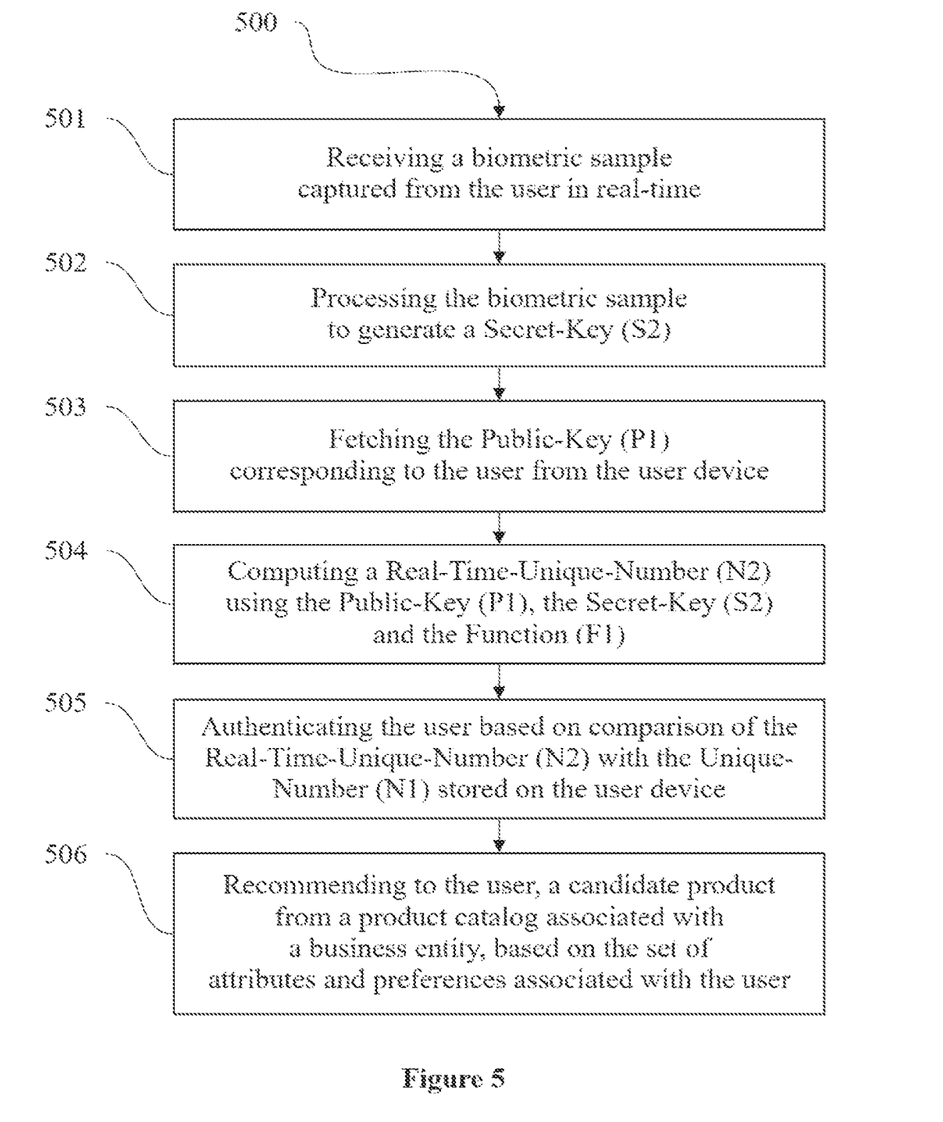
FIG. 5 illustrates a method 500 for user authentication, in accordance with an embodiment of the present disclosure.

Now referring to FIG. 5, a method 300 for user authentication is illustrated, in accordance with an embodiment of the present subject matter.

At step 501, the processor 201 may be configured to receive a biometric sample from the user. The biometric sample may be captured from the user in real-time.

At step 502, the processor 201 may be configured to process the biometric sample to generate a Secret-Key (S2). It must be noted that the Secret-Key (S2) will be different from Secret-Key (S1) if the user is not the same person.

At step 503, the processor 201 may be configured to fetch the Public-Key (P1) corresponding to the user from the user device 103.

At step 504, the processor 201 may be configured to compute a Real-Time-Unique-Number (N2) using the Public-Key (P1), the Secret-Key (S2) and the Function (F1).

At step 505, the processor 201 may be configured to authenticate the user based on comparison of the Real-Time-Unique-Number (N2) with the Unique-Number (N1) stored on the user device 103. It must be noted that when biometric samples from the same user are captured, the Secret-Key (S2) generated in real-time is the same as the Secret-Key (S1) that was generated during user registration. As a result, the Real-Time-Unique-Number (N2) generated using the Public-Key (P1), the Secret-Key (S2) and the Function (F1) will be the same as the Unique-Number (N1) stored on the user device. In case false biometric samples are provided during authentication, the Secret-Key (S2) generated in real-time will not be the same as the Secret-Key (S1). Due to this, the Real-Time-Unique-Number (N2) will not match the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

At step 506, if the user is successfully authenticated, the processor 201 may be configured to execute programmed instructions stored in the memory for recommending to the user, a candidate product from a product catalog associated with a business entity, based on the set of attributes and preferences associated with the user. The process for registration of business entities is illustrated as below with reference to the flowchart of FIG. 6.

Figure 6:
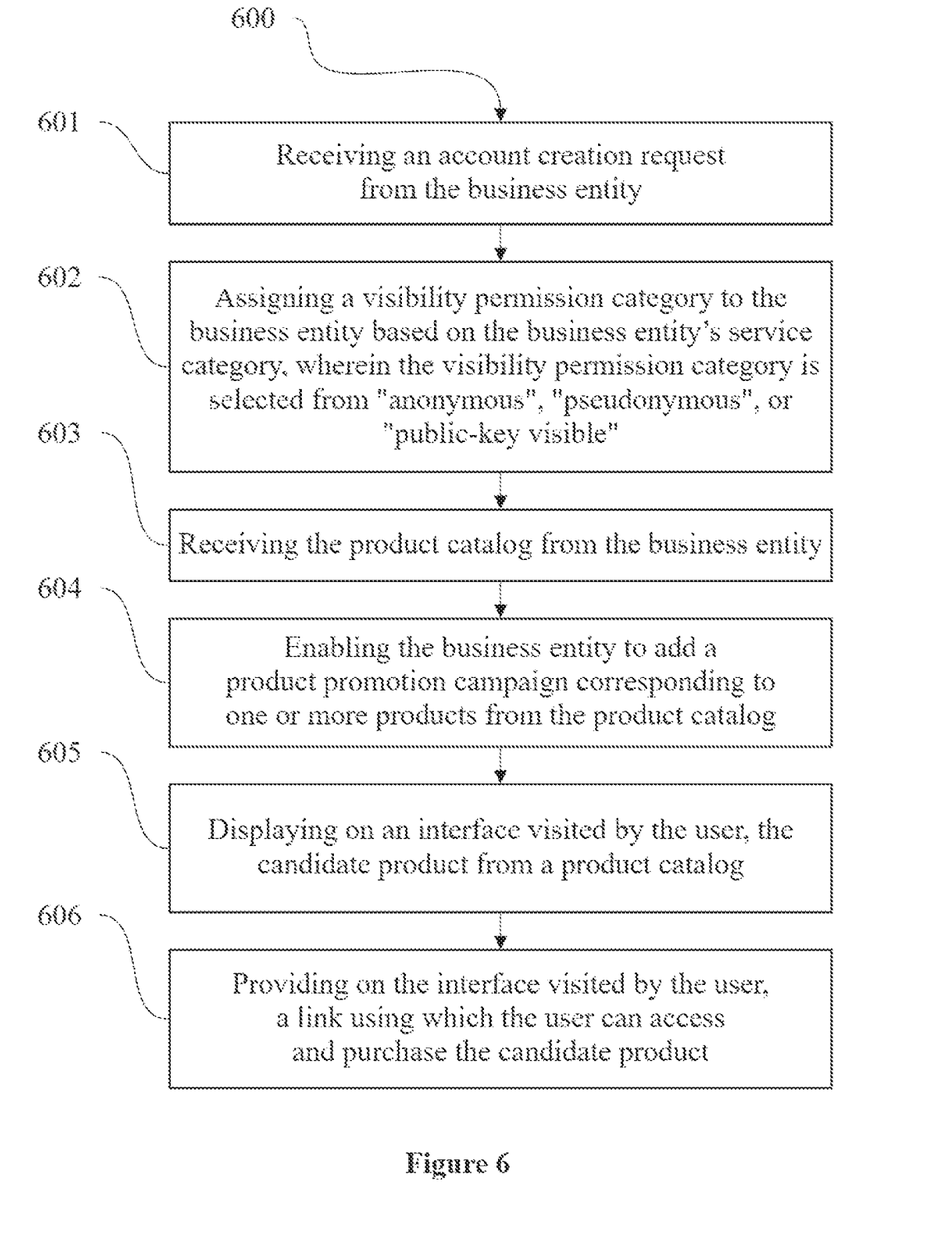
FIG. 6 illustrates a method 600 for business registration and targeted product promotion without having the user reveal their identity, in accordance with an embodiment of the present disclosure.

Now referring to FIG. 6, a method 600 for business registration and targeted product promotion without having the user reveal their identity is illustrated, in accordance with an embodiment of the present subject matter.

At step 601, the processor 201 may be configured to receive an account creation request from the business entity through the network 104.

At step 602, the processor 201 may be configured to assign a visibility permission category to the business entity based on the business entity's service category. The visibility permission category may be categorized as anonymous, pseudonymous, or public-key visible. For instance, a business entity providing refueling services may be assigned anonymous visibility, a business entity providing concierge services may be assigned pseudonymous visibility, and a business entity providing merchant services may be assigned public-key visibility.

At step 603, the processor 201 may be configured to receive the product catalog from the business entity.

At step 604, once the business registration is complete, the processor 201 may be configured for enabling the business entity to add a product promotion campaign corresponding to one or more products from the product catalog. For this purpose, the processor 201 may provide an interface for the business entity to select attributes and preferences corresponding to the attributes and preferences of a target audience for one or more of the business entity's products. Further, the processor 201 may provide an interface for the business entity to configure settings to promote one or more products. The settings may correspond to budget, period of time, audience size, and other parameters associated with the product promotion campaign.

At step 605, the processor 201 may be configured to display on an interface visited by the user, the candidate product from the product catalog, such that the candidate product is discoverable by the user. It must be noted that the candidate product is selected based on matching the set of attributes and preferences of the user with the corresponding set of attributes and preferences of the product's target audience.

At step 606, the processor 201 may be configured to provide a link on the interface visited by the user. Using this link, the user can access and purchase the candidate product. It must be noted that during the entire process of identifying the candidate product from the product catalog and displaying it on an interface visited by the user, the user does not reveal any personally identifiable information to the system or to the business entity. If the preferences match, the candidate product is displayed on an interface visited by the user.

Although implementations for the system 101 and the method 300 for sharing user preferences pertaining to one or more products, without having the user reveal their identity, have been described in language specific to structural features and methods, it must be understood that the claims are not limited to the specific features or methods described. Rather, the specific features and methods are disclosed as examples of implementations for the system 101 and the method 300 for sharing user preferences, pertaining to one or more products, without having the user reveal their identity.

The invention claimed is:

1. A system for sharing user preferences, pertaining to one or more products, without having the user reveal their identity, comprising:
 a processor and a memory coupled to the processor, wherein the processor is configured to execute instructions stored in the memory for:
  registering a user by,
   receiving a set of biometric samples of the user, corresponding to one or more biometric factors,
   processing the set of biometric samples to compute a Secret-Key (S1) corresponding to the user,
   generating a Unique-Number (N1) using a random number generation algorithm,
   applying a Function (F1) to the Secret-Key (S1) and the Unique-Number (N1) to compute a Public-Key (P1), wherein the Function (F1) is based on Asymmetric Key Encryption, wherein the Function (F1) consumes the Secret-Key (S1) and the Unique-Number (N1) to compute the Public-Key (P1), wherein the Public-Key (P1) is distinct from the Secret-Key (S1),
   capturing a set of attributes and preferences of the user pertaining to a category of products associated with one or more business categories,
   storing the Unique-Number (N1) on a user device and in a data repository,
   storing the set of attributes and preferences in the data repository, and
   storing the Public-Key (P1) on the user device and in a peer-to-peer distributed hash-table;
  authenticating the user by,
   receiving a biometric sample captured from the user in real-time;
   processing the biometric sample to generate a Secret-Key (S2);
   fetching the Public-Key (P1) corresponding to the user from the user device;

computing a Real-Time-Unique-Number (N2) using the Public-Key (P1), the Secret-Key (S2) and the Function (F1);

authenticating the user based on comparison of the Real-Time-Unique-Number (N2) with the Unique-Number (N1) stored on the user device; and recommending to an authenticated user, a candidate product from a product catalog associated with a business entity, based on the set of attributes and preferences associated with the authenticated user.

2. The system of claim 1, wherein the business entity is registered by, receiving an account creation request from the business entity;

assigning a visibility permission category to the business entity based on the business entity's service category, wherein the visibility permission category is selected from anonymous, pseudonymous, and public-key visible; and receiving the product catalog from the business entity.

3. The system of claim 2, further configured for enabling the business entity to add a product promotion campaign corresponding to one or more products from the product catalog by, providing an interface for the business entity to select attributes and preferences corresponding to the attributes and preferences of the target audience for one or more of the business entity's products; and providing an interface for the business entity to configure settings to promote one or more products, wherein the settings correspond to budget, period of time, audience size, and other parameters associated with the product promotion campaign.

4. The system of claim 3, further configured for, displaying on an interface visited by the authenticated user, the candidate product from a product catalog, such that the candidate product is discoverable by the authenticated user, wherein the candidate product is selected based on matching the set of attributes and preferences of the authenticated user, with the corresponding set of attributes and preferences of the product's target audience; and providing on the interface visited by the authenticated user, a link using which the authenticated user can access and purchase the candidate product.

5. The system of claim 1, wherein the one or more biometric factors correspond to fingerprint, face, voice, retina, and palm vein, wherein the set of biometric samples are captured by the user device.

6. A method for sharing user preferences, pertaining to one or more products, without having the user reveal their identity, the method comprising processor implemented steps of:

registering a user by, receiving a set of biometric samples of the user corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption, wherein the Function (F1) consumes the Secret-Key (S1) and the Unique-Number (N1) to compute the Public-Key (P1), wherein the Public-Key (P1) is distinct from the Secret-Key (S1), capturing a set of attributes and preferences of the user pertaining to a category of products associated with one or more business categories, storing the Unique-Number (N1) on a user device and in a data repository, storing the set of attributes and preferences in the data repository, and storing the Public-Key (P1) on the user device and in a peer-to-peer distributed hash-table:

authenticating the user by, receiving a biometric sample captured from the user in real-time;

processing the biometric sample to generate a Secret-Key (S2);

fetching the Public-Key (P1) corresponding to the user from the user device;

computing a Real-Time-Unique-Number (N2) using the Public-Key (P1), the Secret-Key (S2) and the Function (F1);

authenticating the user based on comparison of the Real-Time-Unique-Number (N2) with the Unique-Number (N1) stored on the user device; and recommending to an authenticated user, a candidate product from a product catalog associated with a business entity, based on the set of attributes and preferences associated with the authenticated user.

7. The method of claim 6, wherein the business entity is registered by, receiving an account creation request from the business entity:

assigning a visibility permission category to the business entity based on the business entity's service category, wherein the visibility permission category set is selected from anonymous, pseudonymous, and public-key visible; and receiving the product catalog from the business entity.

8. The method of claim 7, further configured for enabling the business entity to add a product promotion campaign corresponding to one or more products from the product catalog by, providing an interface for the business entity to select attributes and preferences corresponding to the attributes and preferences of the target audience for one or more of the business entity's products; and providing an interface for the business entity to configure settings to promote one or more products, wherein the settings correspond to budget, period of time, audience size, and other parameters associated with the product promotion campaign.

9. The method of claim 8, further configured for, displaying, on an interface visited by the authenticated user, the candidate product from a product catalog, wherein the candidate product is discoverable by the authenticated user, wherein the candidate product is selected based on matching the set of attributes and preferences of the authenticated user with the corresponding set of attributes and preferences of the product's target audience; and providing on the interface visited by the authenticated user, a link using which the authenticated user can access and purchase the candidate product.

10. The method of claim 6, wherein the one or more biometric factors correspond to fingerprint, face, voice, retina, and palm vein, wherein the set of biometric samples are captured by the user device.

11. A computer program product having a processor and a non-transitory, machine-readable storage medium for sharing user preferences, pertaining to one or more products, without having the user reveal their identity, the computer program product comprising:
  a program code for:
  registering a user by,
    receiving a set of biometric samples of the user, corresponding to one or more biometric factors,
    processing the set of biometric samples to compute a Secret-Key (S1) corresponding to the user,
    generating a Unique-Number (N1) using a random number generation algorithm,
    applying a Function (F1) to the Secret-Key (S1) and the Unique-Number (N1) to compute a Public-Key (P1), wherein the Function (F1) is based on Asymmetric Key Encryption, wherein the Function (F1) consumes the Secret-Key (S1) and the Unique-Number (N1) to compute the Public-Key (P1), wherein the Public-Key (P1) is distinct from the Secret-Key (S1),
    capturing a set of attributes and preferences of the user pertaining to a category of products associated with one or more business categories,
    storing the Unique-Number (N1) on a user device and in a data repository,
    storing the set of attributes and preferences in the data repository, and
    storing the Public-Key (P1) on the user device and in a peer-to-peer distributed hash-table;
  authenticating the user by,
    receiving a biometric sample captured from the user in real-time;
    processing the biometric sample to generate a Secret-Key (S2);
    fetching the Public-Key (P1) corresponding to the user from the user device;
    computing a Real-Time-Unique-Number (N2) using the Public-Key (P1), the Secret-Key (S2) and the Function (F1);
    authenticating the user based on comparison of the Real-Time-Unique-Number (N2) with the Unique-Number (N1) stored on the user device; and
  recommending to an authenticated user, a candidate product from a product catalog associated with a business entity, based on the set of attributes and preferences associated with the authenticated user.

* * * * *